Oct. 4, 1966 W. E. BRIGGS 3,277,295
MASS SPECTROMETER LEAK DETECTOR AND ION SOURCE THEREFOR
HAVING MAGNETIC FOCUSING MEANS
Filed April 7, 1966 5 Sheets-Sheet 2
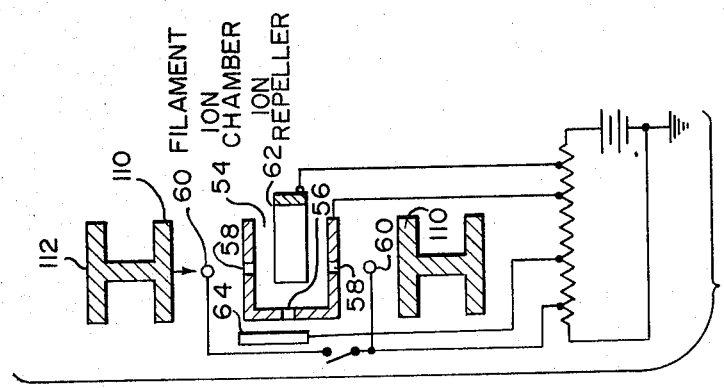
FIG. 4
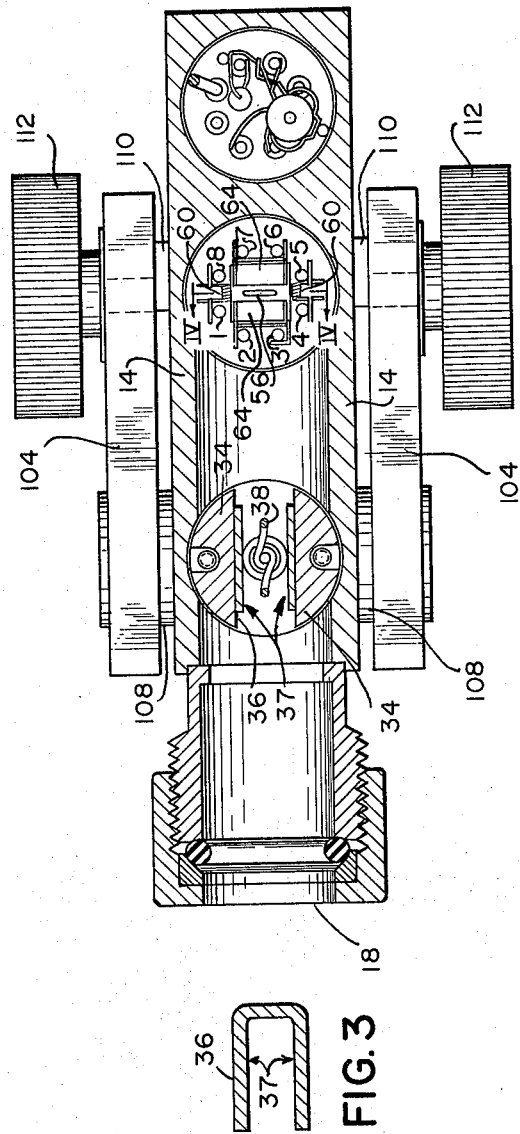
FIG. 2
FIG. 3

United States Patent Office 3,277,295
Patented Oct. 4, 1966

---

3,277,295
MASS SPECTROMETER LEAK DETECTOR AND ION SOURCE THEREFOR HAVING MAGNETIC FOCUSING MEANS
Walton E. Briggs, Lynnfield, Mass., assignor to National Research Corporation, Newton, Mass., a corporation of Massachusetts
Filed Apr. 7, 1966, Ser. No. 540,906
20 Claims. (Cl. 250—41.9)

This application is a continuation-in-part of application Serial No. 332,154 filed Dec. 20, 1963 and now Patent No. 3,265,890.

The present invention relates to an improved construction of vacuum apparatus and more particularly to an improved construction of a mass spectrometer leak detector.

Mass spectrometer leak detection has been a familiar technique in the vacuum art since first practiced at the University of Minnesota in 1943. A mass spectrometer is set to detect a probe gas, such as helium, and the probe gas is applied to the main vacuum system under investigation. The mass spectrometer samples gas from the pumping line of the system under investigation. A separate pumping system is provided for the mass spectrometer and a throttle valve couples the mass spectrometer to the main vacuum system.

It is a principal object of the invention to provide an improved mass spectrometer leak detector of simple construction with adequate sensitivity for its leak detection function.

In general, this object is accomplished by providing a thin, vacuum tight leak detector member with an external magnet. The member and magnet are of simple construction. The leak detector electrodes are supported in the member by vacuum feedthroughs. Magnetic focusing is used in the ionization portion of the leak detector. The ion source electrodes are made in the form of a disposable construction. The alignment of the electrodes with the member is non-critical. Adequate sensitivity is achieved by adjusting the magnetic field outside the vacuum and by the ion source construction described below.

A further object of the invention is to provide a mass spectrometer leak detector member, with internal Phillips gauge, of compact construction with easy access to all parts which must be serviced.

The member preferably has the form of a thin box with opposed parallel faces and narrow side walls. The magnet comprises a yoke and pole plates straddling the faces. Pairs of pole extensions extend inwardly from the pole plates to concentrate magnetic fields in the gauge, ion source and analyzer portions of the member. Demountable vacuum feedthroughs support a Phillips gauge, an ion source and a collector in an internal cavity of the body. The feedthroughs are in a side wall and in close proximity to each other.

The magnet can be assembled with the member and placed in a leak detector cabinet with the feedthroughs being accessible for ease of servicing. Then the magnetic field is adjusted during operation of the leak detector to establish a desired sensitivity of the ion source.

Other objects of the invention will in part be obvious and will in part appear hereinafter.

The invention accordingly comprises an improved machine possessing the construction and arrangement of parts exemplified in the following detailed disclosure and the accompanying drawings and the scope of application of which will be indicated in the claims.

FIG. 2 is a sectional view transverse to FIG. 1 taken along the section II—II as indicated in FIG. 1;

FIG. 3 shows the construction of the Phillips gauge cathode liner;

FIG. 4 is a schematic diagram, in the form of an exploded section taken along the line IV—IV in FIG. 2, of the ion source and magnet poles according to a first and preferred embodiment of the invention illustrating the general mechanical arrangement of parts and also indicating the electrical arrangement of parts in the ion source;

FIGS. 1–5

Figure 1:
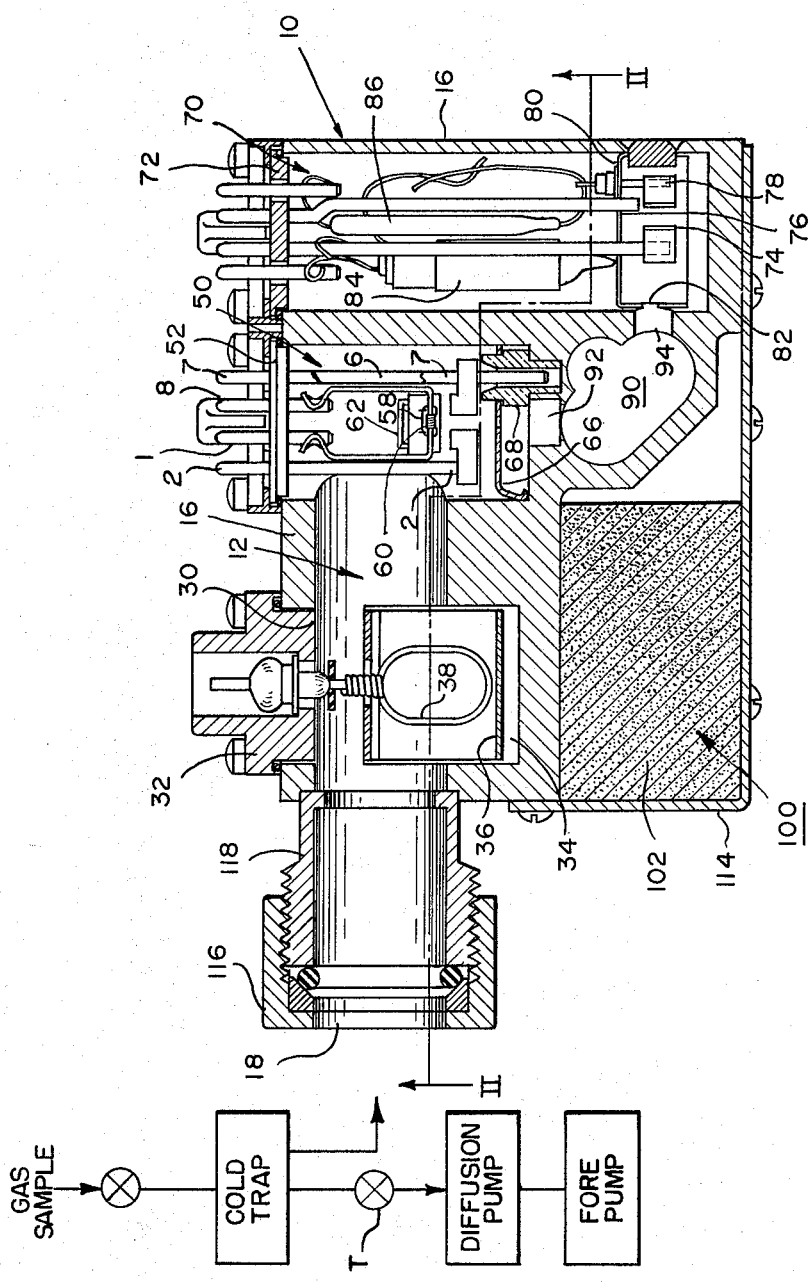
FIG. 1 is a sectional view showing the arrangement of spectrometer parts in the body member according to a preferred embodiment of the invention.

The leak detector vacuum system is shown in black box form since such systems are well known in the art. Gas is sampled from the foreline of a vacuum system under investigation to a leak detector pumping system which includes a liquid nitrogen cold trap, a small diffusion pump (2 inches nominal diameter) and a small forepump. A proportion of sampled gas is introduced to the mass spectrometer body member by using an adjustable throttle valve T to limit the diffusion pump.

The body member comprises a solid block 10. Crossing holes are machined through the block to define an internal cavity 12 which serves as the gas flow path of the spectrometer. The cavity is enclosed by parallel, opposed planar faces 14 spanned by narrow side walls 16. A gas flow opening 18 extends through a side wall to the cavity. Auxiliary openings 30, 50 and 70 also extend through a side wall to the cavity.

IONIZATION GAUGE (FIGS. 1, 2, 3)

A Phillips gauge is supported on a demountable vacuum closure 32 for insertion and removal through opening 30. The Phillips gauge comprises a pair of semi-cylindrical pole pieces 34 for concentrating a magnetic field within the gauge portion of the cavity, a disposable cathode 36 which comprises a sheet bent to form two cathode faces 37 and a wire anode 38. The cathode 36 is sufficiently resilient to bear against its supporting magnet pole pieces 34. The anode and pole pieces are mounted in the closure 32. The body member 10, and consequently the cathode 36, are at ground potential. The anode 38 is maintained at a positive potential of about 2000 volts.

ION SOURCE (FIGS. 1, 2, 4, 4A, 4B)

An ion source is supported on a demountable vacuum closure 52 for insertion and removal through opening 50. The closure 52 comprises a conventional eight-pin vacuum tube feedthrough. The ion source comprises an ion chamber electrode 54 which is open to the flow of gas from the inlet opening 18 and the Phillips gauge. The ion chamber electrode has an ion exit slit 56 and upper and lower slits 58 for the admission of electrons. Upper and lower thermionic filaments 60 provide alternative sources of electrons for ionizing gas molecules in the ion chamber electrode region. One of the filaments is operated and the other is reserved as a spare. When the first filament burns out, the spare can then be switched on until it is convenient to break the vacuum and replace the entire ion source. The symmetrical alignment insures similar operating characteristics with either filament. Positively biased ion repeller electrode 62 is disposed in the ion chamber and opposite exit slit 56 to force a beam of ions out through the exit slit.

Focusing of the electrons is accomplished by a magnetic field disposed parallel to the aligned filaments 60. The space charge of the confined electron beam, in turn, aids in the focusing of the ion beam. The ion beam is further focussed by cooperation of the ion repeller and ion chamber and by focus plates 64 disposed outside the ion chamber and in proximity to the exit slit 56.

Alignment of the ion source electrodes and construction of the ion source emphasizes ruggedness and economy. The ion source is designed as a throwaway unit to be replaced when the filaments burn out or excessive insulating deposits build up on the electrodes. In the prior art, magnetic focus ion sources have relatively expensive and careful design of the ion chamber and repeller and focus electrodes to assure proper alignment with an electrostatic or magnetic focus field. The filament must be provided in a replaceable form. The source construction and the adjustable magnetic field, described below, give sufficient sensitivity to the present ion source to allow a more rugged and inexpensive construction.

The electrodes are all spot welded to the pins 1-8. The filaments are supported on pins 1, 8, 4 and 5. The ion chamber electrode and repeller electrode are supported between the filaments by pins 3 and 6, respectively. Pins 2 and 7 are longer than the other pins and are utilized to support focus plates 64 beyond exit slit 56. The relative D.C. bias imposed on the respective electrodes is indicated by the schematic drawing of a voltage divider in FIG. 4.

The series arrangement of the Phillips gauge between the gas flow inlet 18 and the ion source substantially prevents filament contamination. This feature is disclosed and claimed in the above-cited parent application S.N. 332,154. Some contaminant gasses get past the Phillips gauge, but these are not sufficient to substantially reduce the sensitivity of or embrittle the hot filament(s) of the ion source. If desired, an optical baffle may be placed in the cavity 12 between the gauge and ion source. Such a baffle serves as a supplementary collection surface for pumped gas particles (in addition to the gauge electrode structure).

ANALYZER (FIGS. 1, 5)

The ion beam is segregated by mass/charge ratios in a 90° analyzer section 90 having an inlet port 92 and exit port 94. A ground slit plate 66 is disposed between the ion source and analyzer. A ceramic locating block 68 is secured in the cavity to locate the removable ion source with respect to the analyzer and the magnetic field. The fit between pin 7 of the ion source and locator 68 is a loose one, simply sufficient to obtain alignment of exit slit 56 of the ion source with the axes of ground plate 66 and port 92 within a few degrees tolerance.

The member 10 has its narrowest width in the region 90 to provide a minimum magnet gap for the external magnet. Face portions 50 of magnetic material are welded into position to concentrate a high field, on the order of 2000 gauss, through the analyzer portion.

COLLECTOR (FIG. 1)

Conventional collector electrodes and preamplifier circuitry are supported on a demountable vacuum closure 72 for insertion and removal through opening 70. The electrodes comprise a suppressor 74, a ground-plate 76, and a collector plate 78, all supported in a collector tube 80 with an entrance port 82. A preamplifier tube 84 and its grid resistor 86 are supported in the cavity 12 by closure 72.

MAGNET (FIGS. 1, 2, 5)

Figure 5:
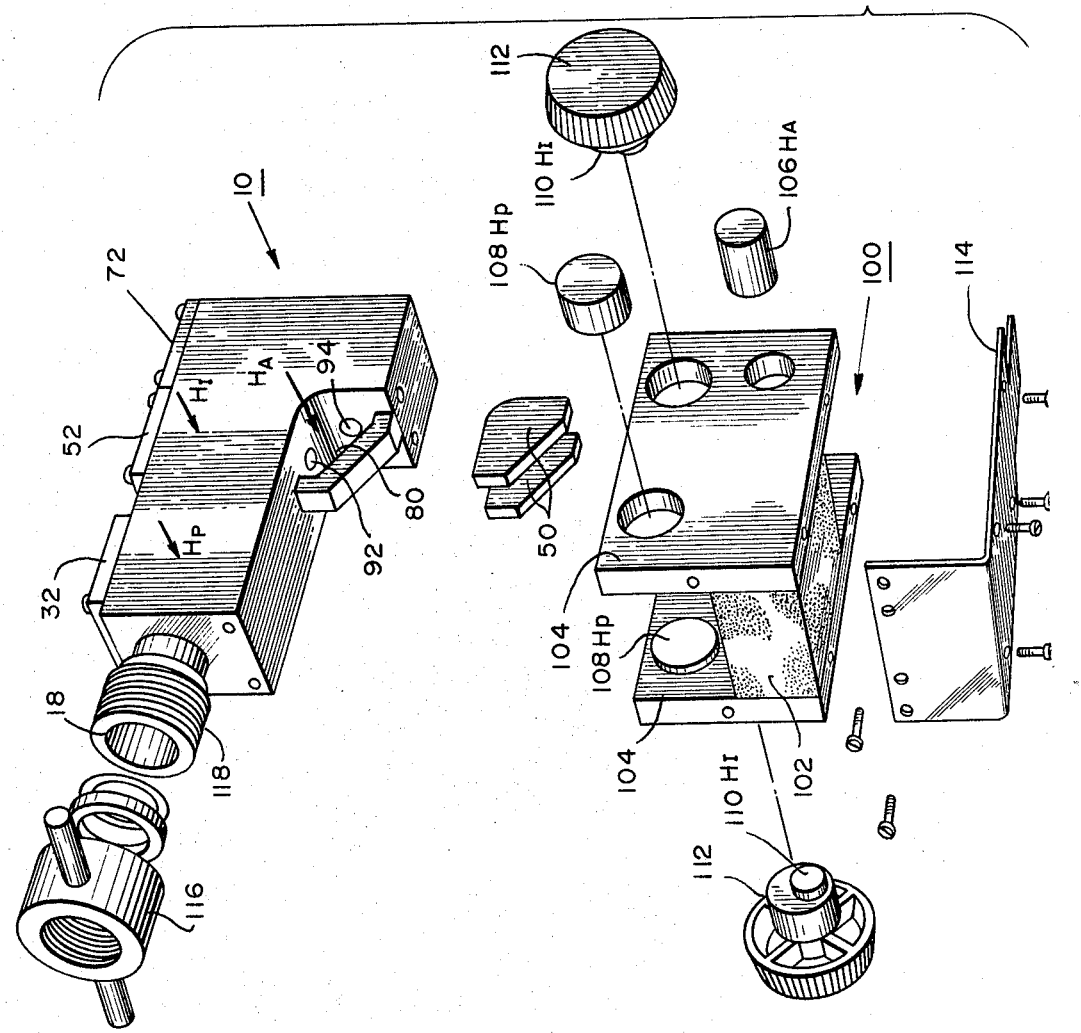
FIG. 5 is an isometric, exploded view of the body member and magnet assemblies.

The mass spectrometer mechanical assembly is shown in exploded form in FIG. 5. The magnet 100 comprises a yoke 102 and a pair of pole plates 104. Pairs of pole extensions 106, 108 and 110 extend inwardly from the plates to provide the magnetic fields for the analyzer ($H_A$), Phillips gauge ($H_p$) and ion source ($H_I$), respectively. Knurled handles 112 are provided for rotating the magnet pole extensions 110 to vary the sensitivity of the ion source.

The yoke 102 is made of alnico while the pole plates and pole extensions are of soft iron. This simple form of the magnet is made possible by the above-described narrow construction of the body, particularly of the analyzer portion 80.

A clamping bar 114 secures the magnet 100 to the body 10. A conventional vacuum flange 116 and pipe 118 can be provided as part of inlet 18 to provide a demountable connection to the pumping system.

ACCESSIBILITY (FIGS. 1, 2, 5)

The assembled mass spectrometer leak detector may be connected to a cold trap (not shown) of a conventional leak detector pumping and sample inlet system (such as that described by Thomas, Williams and Hipple in Review of Scientific Instruments, vol. 17, p. 368). The mass spectrometer and cold trap are recessed in a cabinet. The operator can reach down into the cabinet to turn knurled handles 112 to adjust the ion source sensitivity while the leak detector is operating or to replace the electrodes mounted on any of closures 32, 52, 72, without disturbing magnet 100. It would, of course, be necessary to break vacuum before removing any of the closures.

Certain changes can be made in the above-described apparatus without departing from the scope of the invention herein involved. For instance, the cammed pole pieces 110 can be of other constructions which provide an adjustable magnetic field through the ion source without disturbing the analyzer and Phillips gauge magnet fields. Many of the structural concepts described above are of general utility in ion sources other than those used in leak detectors.

FIG. 4B

Figure 4A:
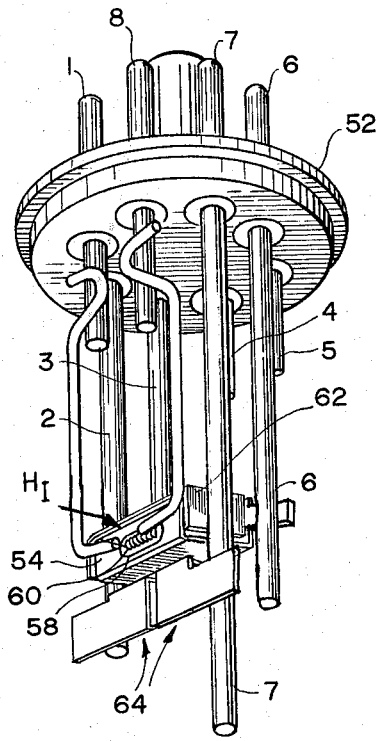
FIG. 4A is an isometric view of the ion source, per se.
Figure 4B:
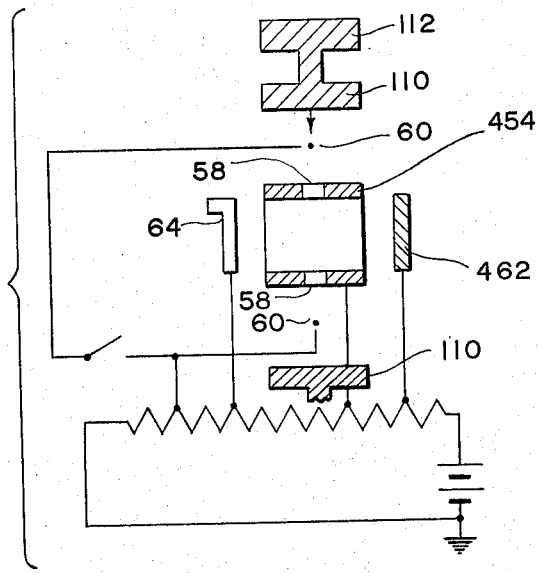
FIG. 4B is a schematic diagram, similar in form to FIG. 4, illustrating a second embodiment of the invention.

A second embodiment of the invention is shown in FIG. 4B which shows a modified ion source. The ion source of this embodiment differs from that of the above-preferred embodiment in that the ion chamber electrode 454 is a cylinder and the ion repeller 462 is a disk compared to the U-shaped ion chamber 54 and U-shaped repeller 62 of the preferred embodiment (shown in FIGS. 2, 4 and 4A).

The FIG. 4B embodiment can also accommodate two filaments 58 either of which can be activated to send electrons through one of the opposed openings 58 in the ion chamber electrode 454.

FIG. 6

Figure 6:
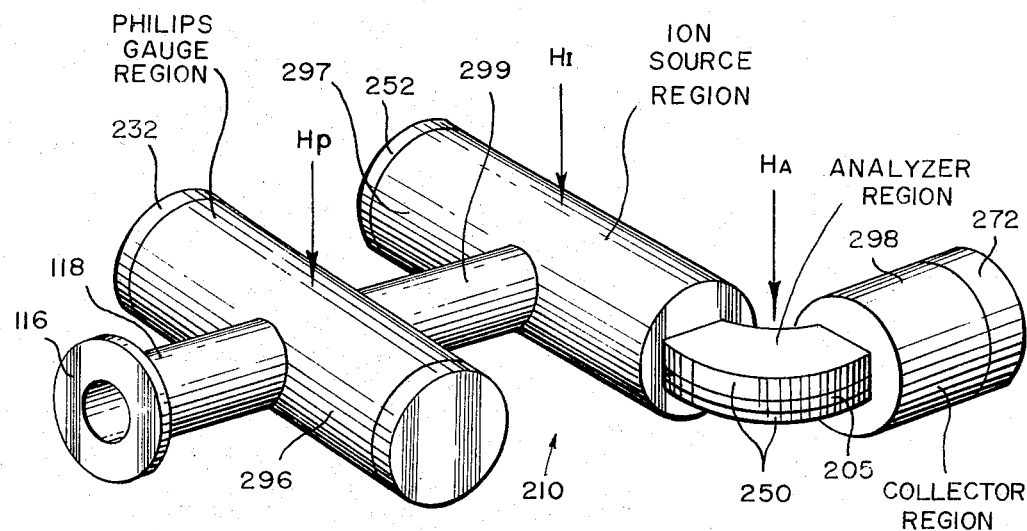
FIG. 6 is an isometric view of a body member of the apparatus according to a third embodiment of the invention.

Another embodiment of the invention is shown in FIG. 6. In this embodiment, the body member is formed of brazed-together tubes 296, 297 and 298 which provide the Phillips gauge, ion source and collector regions. These tubes may be interconnected by additional conduits such as tube 299. A bridging section 205 with magnetic wall inserts 250 may be used to form a narrow analyzer. Phillips gauge, ion source, and collector are mounted on demountable closures 232, 252, and 272, respectively (similar to the closures 32, 52 and 72 of the preferred embodiment above). The electrode and magnet structure of this embodiment may be the same as that of any of the other embodiments herein.

Magnetic fields are provided as indicated by the arrows $H_P$, $H_I$ and $H_A$ for the gauge, ion source, and analyzer, respectively.

The brazed tube construction of the FIG. 6 embodiment is in contrast to the machined block construction of the FIG. 1 embodiment. But both embodiments have it in common that a mass spectrometer body member with opposed faces and relatively narrow side walls is straddled by magnet poles, the body member having demountable closures on the side wall supporting electrodes within the mass spectrometer body. The FIG. 1 embodiment has the three demountable closures 32, 52, 72 in close proximity to each other and it will be understood that the FIG. 6 embodiment could be modified by rearranging tube 298 so that closure 272 is adjacent closure 252.

FIG. 7

Figure 7:
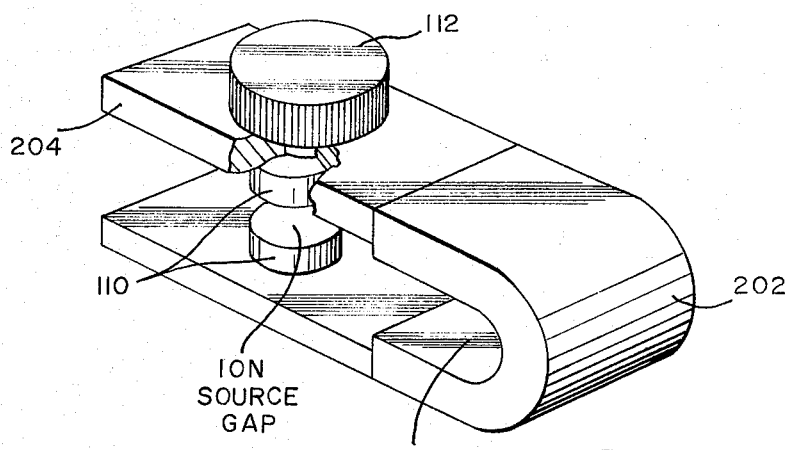
FIG. 7 is an isometric view of a magnet member of the apparatus according to a fourth embodiment of the invention.

Another embodiment of the invention is shown in FIG. 7. A common magnet 202 is provided for the analyzer and ion source (with a separate magnet being provided for the gauge). A narrow analyzer gap is provided adjacent the yoke. Pole plate extensions 204 provide a link to pole pieces 110 which provide the ion source field. The pole pieces 110 are the same as in FIGS. 2 and 5 and include handles 112. The analyzer gap is narrower than the ion source gap.

The magnet of FIG. 7 may be used with the machined body member of FIGS. 1–5 or the brazed tube body member of FIG. 6.

The pole plates 204 can be enlarged, if desired to accommodate Phillips gauge pole pieces.

FIG. 8

Figure 8:
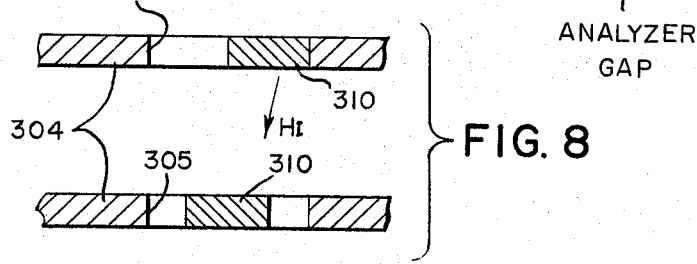
FIG. 8 is a partially sectional view of magnet pole plates and ion source pole extensions according to a fifth embodiment of the invention.

Another embodiment of the invention is shown in FIG. 8 wherein a modification of the pole plates for the adjustable ion source field ($H_I$) is shown. The magnet structure may be generally as shown in FIG. 5, or in FIG. 7, and it includes pole plates 304. Each of the pole plates has a hole 305 in the desired region of the ion source. Pole pieces are movable within the holes 305 along the edges thereof to provide adjustment of the direction of the field $H_I$. The pole pieces may be secured in their various adjusted positions by washers (larger than holes 305) and tie down screws or by other adjustable means.

Unlike the previous embodiments the FIG. 8 embodiment does not have the ion source pole pieces extending inwardly. This is not as efficient as the other embodiments, but is acceptable, so long as the general field strength between pole plates 304 is adequate for the ion source. High sensitivity of the ion source is achieved by the spectrometer operator who moves pole pieces 310 from time to time.

There are various other modifications which can be made from the preferred embodiment, which may be more or less desirable depending on the particular requirements of the user. The common link of all the above-disclosed embodiments, and equivalents thereof, is that an economical ion source (e.g., the ion source of FIGS. 4–4A or the ion source of FIG. 4B) is provided and made comparable in performance to the expensive ion sources of the prior art by the combination therewith of external (outside the mass spectrometer body) magnet means (e.g., the magnet of FIG. 5; the magnet of FIG. 7; either of FIG. 5 or FIG. 7 with the modification of FIG. 8), which are adjustable to achieve high sensitivity despite the small misalignments inherent in the simple construction of the ion source. The general economy of the construction is furthered by combining the adjustable magnet of the ion source and the fixed analyzer magnet in a single structure (e.g. as in FIG. 5 or FIG. 7). Preferably, the fixed Phillips gauge magnet is combined in the same structure as in FIG. 5.

An additional contribution to the art, interdependent with the foregoing, is presented in the subcombination of the ion source (FIGS. 4–4A species or FIG. 4B species). This ion source accommodates a space filament, is quite economical and has utility in devices other than mass spectrometers, such as total pressure vacuum gauges.

An additional and discrete contribution to the art is presented in the gas flow series arrangement of the Phillips gauge and ion source which, surprisingly, essentially eliminates the long standing problem of filament contamination which has plagued the mass spectrometer. This contribution is separately claimed in my above-cited parent application.

The contributions of the present invention are capable of being rendered in several different physical forms and contexts as shown here or in other forms not shown here. Therefore, it is intended that the above description and accompanying drawings shall be interpreted as illustrative and not in a limiting sense.

What is claimed is:

1. An improved mass spectrometer comprising in combination:
   (a) a body member having opposed faces and narrow side walls enclosing a gas evacuated internal cavity, a gas flow inlet in the surface of the body leading to the cavity and adapted to be connected to a system to be investigated, auxiliary openings in the surface of the body also leading to the cavity,
   (b) demountable vacuum closure means covering said auxiliary openings and supporting a cold cathode discharge gauge, ion source electrodes and a collector in said cavity,
   (c) magnet means providing magnetic fields through the gauge, through the ion source, and through a portion of the cavity between the ion source and collector, and comprising opposed pole plates external of the gauge and straddling the faces of the body with pairs of pole extensions extending inwardly from the plates to provide said fields and wherein the pole extensions which provide said ion source field are adjustable to vary the sensitivity of the ion source.

2. The mass spectrometer of claim 1 wherein said auxiliary openings are in the side walls in close proximity to each other to provide a common region of access to the mass spectrometer parts.

3. An improved construction of ion source for use in mass spectrometers and the like and comprising, in combination:
   (a) a body member enclosing a cavity, a first opening in the surface of the body connected to the cavity and constructed and arranged as a gas flow inlet, a second opening in the surface of the body connected to the cavity, a demountable closure, said demountable closure covering said second opening;
   (b) an ion source structure mounted on said demountable closure and suspended therefrom within the cavity and comprising ion chamber electrode means and at least one filament, an ion repeller electrode disposed adjacent the ion chamber, the ion repeller electrode and ion chamber electrode being constructed and arranged to provide a substantially enclosed ionization volume with at least a first inlet opening and a second exit opening, the filament being arranged outside said volume for injecting electrons into the opening through said inlet opening, the repeller electrode being arranged opposite to said exit opening, at least one focus electrode disposed outside the ionization volume and in proximity to the exit opening, said filament, ion chamber, repeller and focus electrodes being individually supported from said closure and being constructed and arranged for insertion and removal of said electrodes as a group through said second opening;
   (c) a magnet mounted adjacent the body with a pair of pole extensions straddling the portion of the body having the ion source and means for adjusting the pole extensions with respect to the magnet to adjust the direction and position of the magnetic field axis to vary the sensitivity of the ion source and (d) the ion chamber being constructed and arranged so that the filament and ionization volume inlet opening are in a line essentially parallel to the direction of the magnetic field.

4. The apparatus of claim 3 wherein the said magnet pole extensions are rotatably mounted for pivoting about axes and are arranged as cams with respect to said axes.

5. The apparatus of claim 3 wherein the extensions are cylindrical and their pivotal axes are offset from their cylindrical axes.

6. The apparatus of claim 3 wherein the magnet comprises parallel pole plates straddling the body with holes in the plates, the pole extensions being mounted on said holes.

7. The apparatus of claim 6 wherein the pole extensions extend inwardly from the plates toward the ion source to narrow the magnet gap.

8. The apparatus of claim 6 wherein the pole extensions are essentially flush with the plates along the inner faces of the plates.

9. The apparatus of claim 3 wherein the said ion chamber electrode means comprises a single electrode having a U-shape in a cross-section taken substantially parallel to the direction of the magnetic field and wherein the repeller electrode has a U-shape in a cross-section taken substantially perpendicular to the magnetic field, the ion chamber and repeller electrodes being cooperatively arranged to form a substantially enclosed volume therebetween.

10. The apparatus of claim 9 wherein the ion source has two filaments aligned so that a line through the two filaments is essentially parallel with the direction of the magnetic field.

11. The apparatus of claim 3 wherein two filaments are provided outside the ionization volume and wherein two inlet openings are provided in the means forming said ionization volume, the openings and filaments being essentially on a line parallel with the direction of the magnetic field.

12. The apparatus of claim 11 wherein the said ion chamber electrode comprises a single electrode having a U-shape in a cross-section taken substantially parallel to the direction of the magnetic field and wherein the repeller electrode has a U-shape in a cross section taken substantially transverse to the magnetic field, the legs of the ion chamber U-shaped constituting opposed walls of the ion chamber electrode and containing the said two openings of the ionization volume.

13. In a disposable ion source structure for operation in a magnetic field in mass spectrometers and the like, a demountable closure for a vacuum system having mounted therein, via lead pins, an ion chamber electrode, a repeller electrode, at least one focus electrode and at least one thermionic filament, the improvement wherein said ion chamber electrode consists of a U-shaped member and said repeller electrode consists of a U-shape member, the ion chamber and repeller electrodes being arranged transversely and in proximity to each other to form a partially enclosed ionization region, an ion exit aperture in the U-base of the ion chamber electrode.

14. An improved mass spectrometer comprising, in combination:

(a) a body member having opposed faces and narrow side walls enclosing a gas evacuated internal cavity, a gas flow inlet in the surface of the body leading to the cavity and adapted to be connected to a system to be investigated, at least first and second auxiliary openings in the side walls of the body also leading to the cavity, (b) first and second demountable vacuum closures covering said auxiliary openings, one of said closures supporting ion source electrodes in said cavity and the other closure supporting a collector in said cavity in a position spaced away from said ion source electrodes, (c) magnet means providing magnetic fields through the ion source and through an analyzer portion of the cavity between the ion source and the collector, said magnet means comprising opposed plates external of the body and straddling the faces of the body in close proximity thereto with pairs of pole extensions extending inwardly from the plate to provide said fields, the pole extensions which provide said ion source field being adjustable with respect to each other and with respect to the body to vary the sensitivity of the ion source, the portions of the body member face walls covering the analyzer portion being made of magnetic material to provide a short analyzer magnetic gap.

15. In a mass spectrometer comprising an ion source, analyzer and collector means, an improved construction thereof comprising:

(a) a body member enclosing a cavity,
(b) ion source and collector means mounted in said cavity;
(c) common magnet means providing magnetic fields for the portion of the cavity containing the ion source electrodes and for a separate analyzer portion of the cavity between the ion source and collector means;
(c') said magnet means comprising a pair of poles external of the body member for providing said ion source field and means for adjusting said poles to adjust the direction and position of the ion source magnetic field without disturbing the analyzer magnetic field;

whereby structural misalignments of the ion source magnetic field are compensated by adjustment of the ion source magnetic field to provide high sensitivity mass analysis of low mass number gas samples, consistent with low cost construction of the ion source means.

16. The apparatus of claim 1 wherein the body member (a) comprises a block with intersecting bores forming said cavity.

17. The apparatus of claim 1 wherein the body member (a) comprises a plurality of brazed tubes with the interiors of the tubes forming said cavity.

18. The apparatus of claim 15 wherein the ion source means comprises means forming an ionization volume having an inlet opening and a filament external of the volume, the filament and inlet opening being aligned essentially parallel with the direction of the magnetic field.

19. The apparatus of claim 18 wherein the ionization volume is substantially enclosed by a box-like electrode construction.

20. The apparatus of claim 18 wherein the ionization volume is substantially enclosed by a cylindrical electrode construction.

No references cited.

RALPH G. NILSON, *Primary Examiner.*

ANTHONY L. BIRCH, *Examiner.*